3,155,610
HYDRATE FORMING SALINE WATER
CONVERSION PROCESS
Virgil C. Williams, St. Louis, Mo., assignor, by mesne assignments, to Sweet Water Development Company, Dallas, Tex., a corporation of Texas
Filed Feb. 8, 1962, Ser. No. 172,030
18 Claims. (Cl. 210—60)

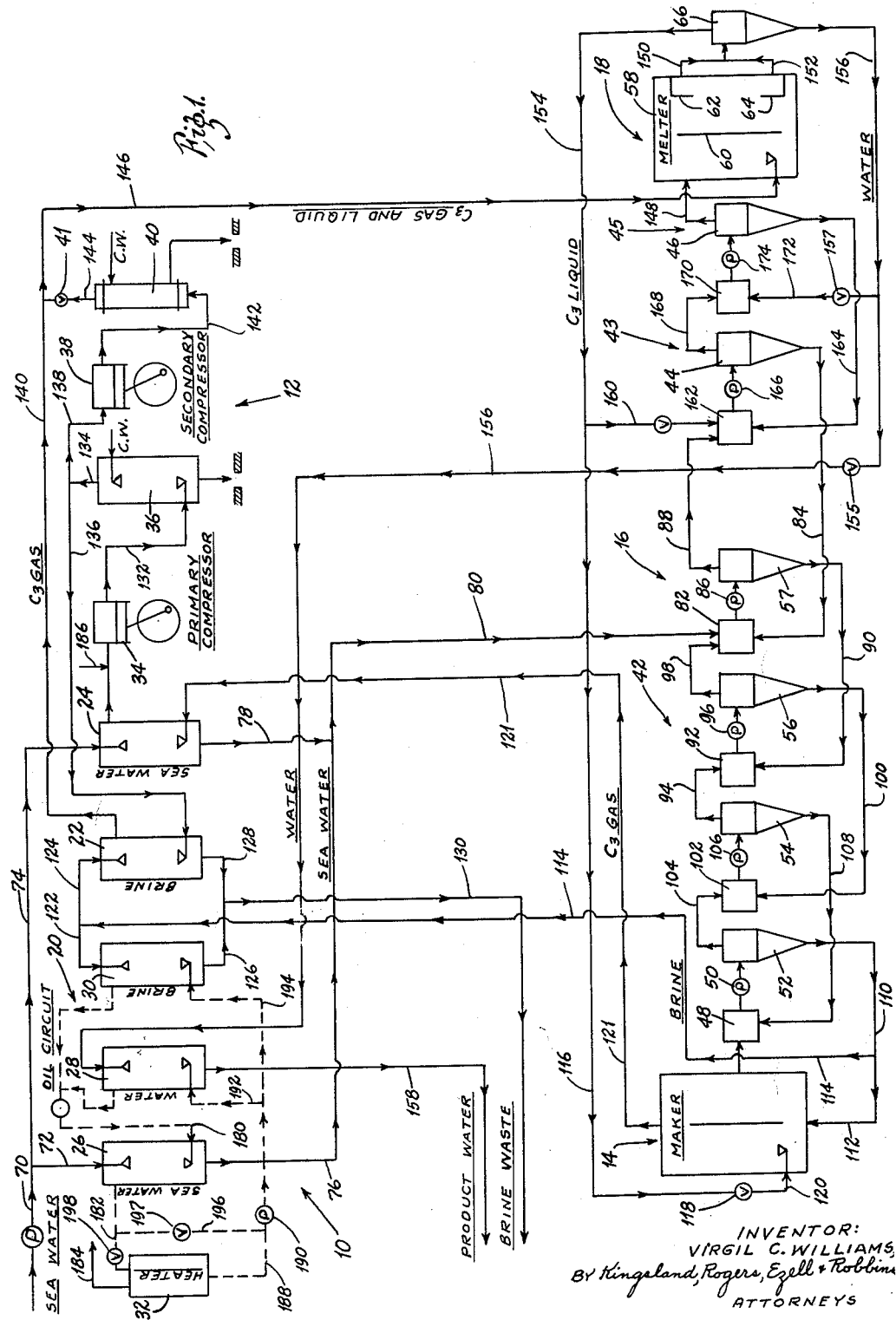

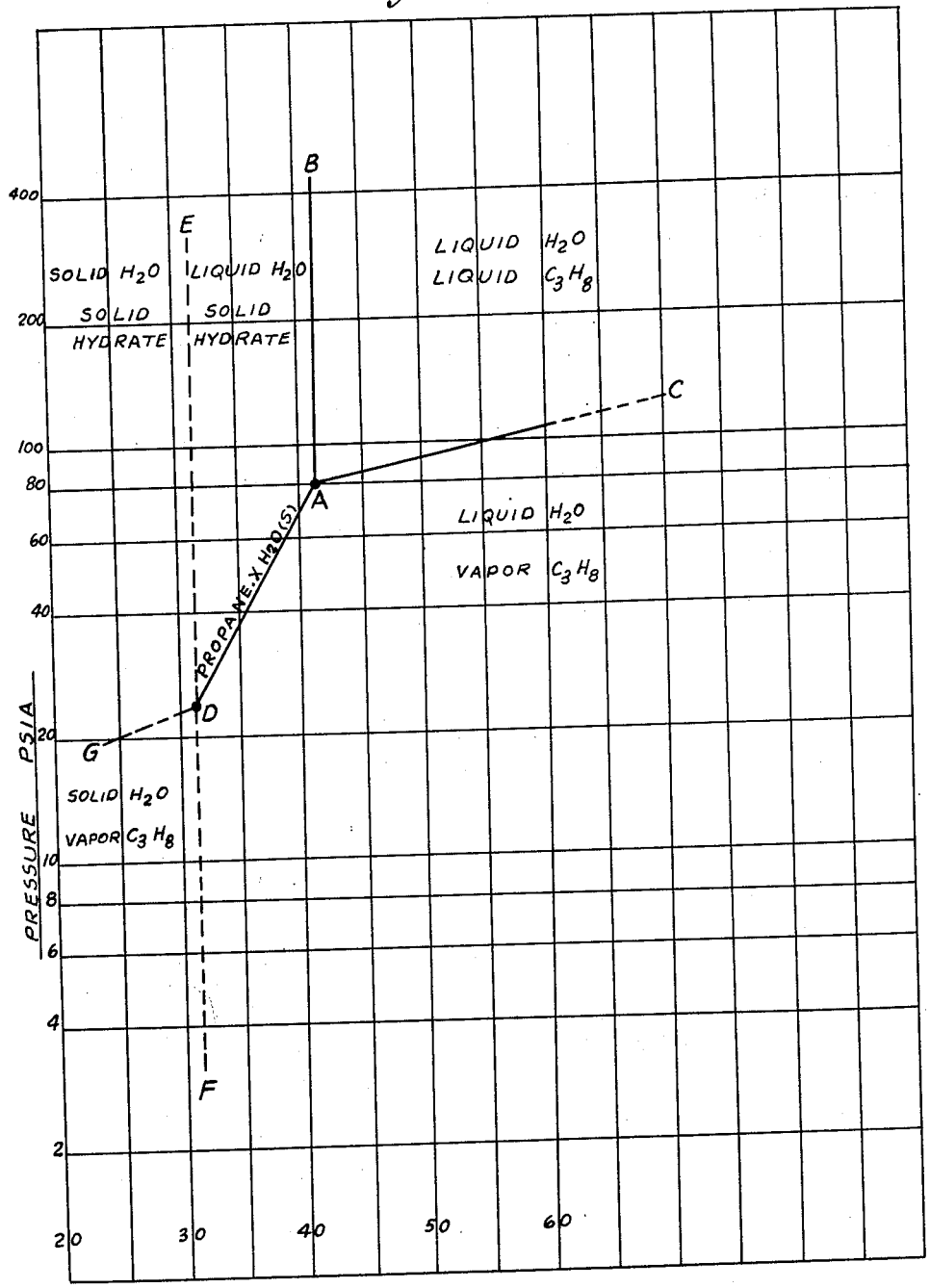

This invention relates to improvements in processes for conversion of saline water to potable water. In the past it has been proposed to form hydrates from saline water, such as sea water and salt water brine, by contacting the saline water with a hydrate forming substance. The hydrate, which, as an example, may be formed by contacting the saline water with a gas, is then separated and regenerated, so to speak, such as by melting, i.e., decomposing, to form relatively pure potable water and the reclaimed hydrate forming substance which can be recycled in the process. Such processes are shown in the Williams Patent No. 2,974,102 and the Donath Patent No. 2,904,511. It has been a particular problem in such processes to effect proper heat and refrigeration utilization and to provide for economic washing of the hydrate crystals. By means of this invention an efficient and economical process has been provided to accomplish these objectives.

It is a feature of this invention that an oil precooling circuit is employed for cooling the saline feed water. The saline feed water may then be used in a countercurrent extraction battery in which cyclone separators are employed to separate the hydrate crystals after formation from the brine. Where desired, however, the feed saline water or a portion of it may be added directly to the hydrate formation stage. The enriched brine, or the saline feed water, or portions of the latter alone, is then used in the hydrate formation stage in which a hydrate forming substance such as propane or other material is employed. After passing through the cyclone separator for washing of occluded brine from the crystal surface in a purification stage, a wash or displacement step is employed in which the displacement fluid has a density so as to displace the brine from the crystal. This crystal may then be washed with water which is required to be used in very reduced amounts over prior processes and the crystals are then melted in a melting stage to provide the regenerated gas where this is used as the hydrate forming substance and water.

By the use of the cyclone separator, a very efficient separation of the brine from the crystals can be effected with a large through-put and the requirement of a very small capital investment in the cyclone separators, which require no moving parts and only a pressure differential for efficient separation of the hydrate crystals from the brine. The use of a displacement fluid, also for washing off occluded brine in the later purification stage, is an advantageous feature that increases the purity while maintaining the economy of the process at a minimal amount.

The above features, and others will be apparent in the description hereinbelow, are objects of this invention and further objects will be readily apparent to those skilled in the art.

For the purpose of illustration of this process, a preferred embodiment of this invention is shown in the description which follows. It will be understood that this detailed description is for the purpose of example only, however, and that the invention is not limited thereto.

In the drawings:
FIGURE 1 is a schematic diagram showing the use of equipment employed and the process steps practiced in this invention; and
FIGURE 2 is a phase diagram for the system of propane and water under varying conditions of temperature and pressure.

In this process a gas is added to saline water under pressure and temperature conditions such that a solid hydrate of the gas is formed. This hydrate is formed in the saline water leaving a residue of saline water of higher salt content since the hydrate formed with the gas has substantially pure water of hydration in the solid or frozen product form. The solid hydrate in crystal state is then separated from the enriched saline water. After being separated, the solid hydrate, under increased pressure conditions and/or increased temperature, is caused to decompose into the original propane and pure water. The gas or its liquefied form is then recycled to the process and the water can be used as potable water. This water is also used for its refrigeration effect with a portion being recycled to wash the separated solid hydrate from residual enriched saline water occluded upon the crystals in a prior washing stage before the melting operation.

There are a number of gases which are appropriate for use in this invention. The gases employed are those which can be caused to form solid hydrates at temperatures near the ambient temperature so that no large amount of refrigeration is required. It will be understood that such solid hydrate formation requires the application of pressure for the formation of the hydrate. However, the cost of compressors and the like to accomplish the pressure necessary is considerably more economical than the high cost of heat transfer in the conventional distillation and freezing methods of water purification. For the purpose of illustration of this application, propane is employed as a preferred embodiment, but it is understood that other gases may likewise be employed and used in this invention, such as chlorine, ethane, ethylene, propane, and carbon dioxide. Other hydrates are known and may be used within the theory of this invention, and, as examples, hydrates of ethyl chloride, methyl iodine, bromine, methylene chloride, carbon disulfide, hydrogen sulfide, acetylene, and methane might be employed.

Reference will now be had to FIGURE 2 which shows, as an example only, the phase diagram of propane which forms a solid hydrate $C_3H_8 \cdot xH_2O(S)$, which is a distinctive molecular association of one molecule of propane with $x$ equal to 17⅔ molecules of water, and is capable of transformation to other phases at the temperatures and pressures shown in the phase diagram.

In the phase diagram of FIGURE 2 the line AC represents the equilibrium between liquid and vapor propane at a slightly higher pressure than for the pure substance due to the presence of water. Above the line AC are the liquid phases of water and propane. Below the line FDAC, liquid water is present with dissolved propane and vapor propane with a small amount of water vapor. This vapor and liquid, when cooled to a temperature to the left of the line AD on the diagram, change to a crystalline solid hydrate of composition $C_3H_8 \cdot xH_2O$ and liquid water where there is an excess of water which is desirable in the process. Further cooling to a temperature to the left of the line DE causes the freezing of the excess liquid water to ice. The line GD is the boundary line between phases which comprise ice and the solid hydrate of $C_3H_8 \cdot xH_2O$ above this line and ice and a vapor phase of principally propane below this line. The line AB represents the equilibrium between the solid hydrate and liquid water to the left of this line and liquid water and liquid propane to the right of this line.

For the purpose of this invention, the line DA in the phase diagram of FIGURE 2 is of great importance, since, by proper operation, a solid phase containing water as solid propane hydrate can be caused to separate or freeze from a liquid phase containing water at temperatures considerably higher than the normal freezing point of water alone. With saline water, the same thing occurs, that is the added substance, propane gas, forms a solid hydrate with water and removes it from the liquid state leaving a relatively concentrated saline water of higher salt content than the feed saline water. In the case of propane hydrates, the freezing points are up to about 44° F. as is illustrated in the phase diagram of FIGURE 2.

Referring now to FIGURE 1, the apparatus employed in this process comprises a heat recovery section 10, a gas compressor section 12, a hydrate maker 14, a washer section 16, and a melter section 18.

The heat recovery section 10 includes a special oil precooling circuit 20 and direct heat exchangers 22 and 24, in which brine and sea water are used respectively in heat exchange relationship with the hydrate forming gas employed in the compressor section. The oil section 20 is comprised of three heat exchangers 26, 28 and 30 in which oil is used in direct heat exchange relationship with feed sea water, potable water, and brine, respectively. This circuit also includes a regenerator heater for splitting off the hydrate forming gas which may be absorbed by oil from any gas dissolved with the brine or water. This heater is designated by reference numeral 32.

The gas compressor section 12 is comprised of a primary compressor 34, a heat exchanger 36 using cooling water for cooling the compressed gas, a secondary compressor 38, and a further heat exchanger 40. An expansion valve 41 is provided for expanding and cooling the compressed and partially liquefied gas by thermo expansion.

The washer section 16 is comprised of a sea water washing section 42, a liquid gas washing displacement section 43, and a water washing section 45. The sea water washing section 42 is comprised of one or more cyclone separators, which, for purpose of example, are four in this embodiment. Each of these separator stages, which are generally similar to the stages employed in the liquid gas washing displacement section 43 and the water washing section 45, is comprised of a cyclone separator preceded by a mixer, such as the mixer 48 and a pump, such as the pump 50 shown associated with the cyclone separator 52 in the sea water washing section. In addition, there are employed in this section cyclone washers 54, 56 and 57.

The melter section 18 is comprised of a melter unit 58. This is provided with an internal baffle 60 over, under and around which circulating hydrate and water may pass. A top baffle 62 provides for entrapment of the lighter than water liquefied gas, while a bottom baffle 64 provides for trapping of liquid water, which is passed with the liquefied gas to the cyclone separator 66 for final separation of the liquefied gas from the water.

Operation

For the purpose of simplicity in the operation of the process, the path of the feed sea water will be traced as it goes through the heat recovery section 10, the washer 16, and the maker 14. In turn the path of the concentrated sea water or brine will be traced as it is separated from the washer section 42 and passes through the heat and refrigeration recovery section 10. Likewise the path of the hydrate forming gas will be traced as it passes from the compressor section 12 to the melter section 18, the liquid gas displacement or washing section 43, the hydrate formation section 14, and the heat and refrigeration recovery section 10. Lastly, the path of the oil in the oil circuit section 20 of the refrigeration and heat recovery section 10 will be followed.

The sea water is introduced to the process as feed through line 70 and is split into two portions by conduits 72 and 74. The conduit 72 is introduced into the direct heat exchange unit 26 where it is passed countercurrent with cooling oil to cool the sea water which leaves the heat exchange through conduit 76. The sea water in line 74 is introduced into direct heat exchanger 24 where it passes in countercurrent heat exchange relation with cold propane gas. The temperature and pressure relationship is such however that no hydrate is formed. The cooled sea water leaves the heat exchange unit 24 through line 78 and is combined with the other portion of the sea water in line 80, which is then introduced into mixer 82 associated with the cyclone separator 57. This sea water is first used as a wash to wash occluded concentrated sea water held on the surface of solid gas hydrate crystals previously formed in the hydration formation stage and is then employed to form the hydrate as will be more fully discussed below.

In the mixer 82, in addition to the sea water, there is added solid gas hydrate crystal from the previous cyclone separator stage 56. Also added to the mixer 82 is the saline water washed or separated from the crystals in the next advanced cyclone separator 44, which is used as a further wash water. This is added to the mixer through line 84. The mixture of solid hydrate, feed sea water, and saline wash water is then pumped from the mixer 82 by pump 86 into the cyclone separator 57.

In the cyclone separator 57 the mixture is subjected to a very high differential gravity which may be in the order 100–200 G's, and the lighter hydrate crystals and the saline water occluded upon the crystals are thrown to the center of the unit and leave the unit through line 88, while the heavier and more concentrated saline water are thrown to the outside of the cyclone separator and leave the unit at the bottom through line 90.

The separated relatively concentrated saline water in line 90 is then passed backward countercurrent to the flow of advancing solid hydrate in the remaining cyclone separators in the wash section 42 building up in concentration as it passes through to the point where it is ultimately added to the hydrate maker or hydrator 14. Thus the saline water in line 90 is next added to the mixer 92, associated with the cyclone separator 56. Also added to the mixer is the solid hydrate with occluded concentrated saline water from line 94. The mixture of solid hydrate crystals and relatively concentrated saline water is then pumped through pump 96 to the inlet of the cyclone separator 56. In the cyclone separator the solid hydrate crystals with occluded saline water, which is of a lower salt content that that added in line 94 to the mixture 92, is separated at the top through line 98 and added to the previously described mixer 82 associated with the cyclone separator 57. Saline water is separated from the bottom of the cyclone separator 56 through line 100. This saline water of increased concentration is then added to mixer 102 associated with the cyclone separator 54.

The cyclone separator 54 is used to wash occluded relatively concentrated saline water from hydrate crystals which have been added from line 104 through the mixer 102 and which is then pumped by pump 106 to the cyclone separator. The separated relatively concentrated brine, which is obtained from the bottom of the separator through line 108 and which is more concentrated than that obtained from the bottom of the next separator 56, is then passed through the mixer 48 associated with the first cyclone separator 52.

In the cyclone separator 52 the solid hydrate crystals, which have been obtained from the hydrator 14, are washed with the highly concentrated brine from line 108 and pumped through pump 50 for separation in the cyclone separator. The concentrated saline water or brine taken off from the bottom of the cyclone separator 52 through line 110 is added in part through line 112 to the hydrator 14, while the remainder is passed through line 114 to the heat and refrigeration recovery section 10 and ultimately to waste or salt recovery.

The brine in line 112 is reacted with propane in the hydrator to form propane hydrate. The propane is obtained through liquid propane line 116 which is expanded through a thermo expansion valve 118 in line 120 for the reaction in the hydrator 14. The excess propane gas, resulting from the vaporization due to the heat of hydration, is taken off through line 121 and passed through the heat and refrigeration recovery section 10. The hydrate crystals formed in the hydrator 14 are then passed to the mixer 48 and the cyclone separator 52 in the washing section previously described to wash the solid hydrate crystals free from concentrated saline water occluded upon the crystals.

The concentrated saline water or brine in line 114 represents waste product of concentrated salt content which is in the order of about 7% salt as compared to about 3½% salt in the feed sea water. This percentage may vary somewhat depending upon the number of stages of washing employed in the process and other variables, as will be well understood in the art. This highly concentrated brine, which can be passed to waste or can be utilized for recovery of the salt content as will be understood, is passed before being processed to waste or further reclamation to the heat and refrigeration recovery section 10 through line 114. This is for the dual purpose of recovering the refrigeration in the cold brine line and also for recovering any adsorbed propane gas that may be dissolved in the brine. Thus, line 114 is split-off into two portions in lines 122 and 124 which pass respectively through the heat exchanger unit 30 and the heat exchanger unit 22. The proportion of split-off in these two sections may be varied by control of valves. The concentrated saline water added to heat exchanger 30 is used in direct heat exchange relationship with the oil employed later on in this section to cool the feed sea water. The oil is lighter than the concentrated saline water and the heavier saline water is drawn off from the heat exchanger through line 126. The portion of the concentrated saline water in line 124 is passed into heat exchanger 22 and there used in direct heat exchange relationship with propane gas to cool the same. After leaving the bottom of the heat exchanger through line 128, the two concentrated saline water portions are combined in line 130 and passed to waste or to a salt recovery system.

The concentrated saline water in the heat exchanger 30 not only provides refrigeration to the oil circuit, but also gives up any dissolved propane gas that may be obtained in the saline water. Thus, the oil passing in countercurrent heat exchange relationship and in direct contact with the concentrated saline water absorbs the dissolved gas and removes it or strips it from the concentrated saline water. Where the propane gas is dissolved in substantial quantities in the concentrated saline water, it will be understood that the valves in lines 122 and 124 may be varied to pass a major portion, or, where desired, all of the saline water through line 122 to the heat exchanger 30 for absorption of this gas and other heat exchange means may be employed in this section to provide for refrigeration of the propane gas, as will be readily understood.

The compressor section 12 is employed to compress the gas which will be condensed to a liquid for later use in a hydrate formation stage and also in the liquefied gas washing section for use with the hydrate crystals. Thus, gas from line 127, after being cooled in heat exchanger 24, is first of all compressed in the primary compressor 34. The partially compressed propane gas, which is heated in the compression operation in the primary compressor, is introduced through line 132 to a heat exchanger 36 where cooling water is employed to cool the gas. The partially cooled propane gas leaves the heat exchanger through line 134 and is split into two lines 136 and 138. In line 136 the gas is passed into the heat exchanger 22 where brine further cools it and the cooled gas is taken out of the heat exchanger in line 140. The other portion of the gas in line 138 is introduced to the secondary compressor 38 where it is compressed and then passed in line 142 to a tube and shell, or a direct contact heat exchanger 40 where it is further cooled and condensed. After leaving the heat exchanger 40 through line 144, the liquid propane is partially expanded through an expansion valve 41 for further cooling and then combined with the propane gas in line 140. The combined propane stream in 146, containing liquid and gas propane, is then added to the hydrate melter 58.

In the hydrate melter 58 the gas propane by condensing is used to melt substantially pure solid hydrate crystals obtained from the cyclone separator 46 in line 148. Circulation is afforded around the baffle 60 and as the gas hydrate melts to liquid propane and water the lighter liquid propane is taken off from the top of the hydrate melter through line 150 and passed with the purified water taken off from the bottom of the melter through line 152 to be charged to the cyclone separator 66. In the cyclone separator the lighter liquid propane is passed off through the top of the cyclone separator through line 154, while the heavier water is taken off from the bottom through line 156. A small portion of this water controlled by valve 157 in line 172 is used in the water washing section 45. The remaining portion of this cold water as controlled by valve 155 is then used to cool the oil in the oil circuit 20 by passing it to the heat exchanger 28 and out through the product line 158 for ultimate use. In the water-oil heat exchanger 28, any propane dissolved in the water will be absorbed by this oil in a manner similar to that occurring in the saline water-oil heat exchanger 30. This product water is under 500 p.p.m. salt, which is the maximum level recommended for use as potable water.

The liquid propane in line 154 obtained as a result of separation in the cyclone separator following the melting of the hydrate crystals is then split into two portions in lines 116 and 160. The first portion in line 116 is passed through the hydrator as previously described. The second portion in line 160 is added to mixer 162 associated with the cyclone separator 44. Also added to the mixer 162 is saline water of dilute solution taken off by line 164 from the cyclone separator 46. To the mixture is added the solid hydrate crystal in line 88 obtained from cyclone separator 57. This mixture is then pumped through pump 166 to the cyclone separator 44 where the liquid propane displaces the saline water occluded upon the hydrate crystals. Also, in a combined purification action, there is additional washing obtained from the dilute saline water in line 164. In cycle separator 44 the hydrate crystals are taken off with liquid propane in line 168 and charged to mixer 170 associated with the cyclone separator 46. At the bottom of the cyclone separator 44 the heavier saline water is taken off through line 84 and charged to the mixer 82 associated with the cyclone separator 57 to which the sea water in line 80 is also added.

In the mixer 170, to which the solid hydrate crystals with propane have been added, there is also added a portion of the purified water from line 156 drawn off in line 172 as controlled by line 157. This mixture is then pumped through pump 174 into the cyclone separator 46 where solid hydrate crystals and propane are taken off at the top, while the dilute saline water is taken off at the bottom line 164 for use in the preceding cyclone separator 44.

In the oil circuit 20 cool oil is added to the heat exchanger 26 through line 180 to cool the seat water by direct heat exchange relation. This oil leaves the heat exchanger through line 182 and with some absorbed propane, which has been absorbed from the concentrated saline water and product water as previously described, is passed to the heater 32. In the heater 32 the lighter propane is stripped from the oil and taken off in line 184 to be passed for recovery in the compressor section where it may be added to the system in line 186 at the inlet side of the primary compressor 34. The oil leaves the heater through line 188 and is pumped by pump 190 through heat exchangers 28 and 30 where it is cooled by the cold water obtained from the system and the concentrated saline water. Thus, this oil is split into two lines 192 and 194, which are passed respectively through the heat exchangers 28 and 30. After leaving these heat exchangers, the oil, with some absorbed propane obtained in the heat exchanger 30 from the concentrated saline water containing dissolved propane, and in heat exchanger 28 from the product water containing dissolved propane, is recombined in the combined line 180. Thus, this oil is effectively cooled in the two heat exchangers 28 and 30 to provide refrigeration for the feed sea water in the heat exchanger 26. Control of the amount of oil flowing through the heater is effected by use of bypass line 196 and valves 197 and 198.

Various changes and modifications may be made in this invention as will be readily apparent to those skilled in the art. Sea water has been mentioned as a saline water to be converted, but it will be understood that other saline waters such as salt lake water, brines, bitterns, and the like may also be employed. It will also be understood that the examples given and the operating conditions set forth may be varied to fit different circumstances and that the invention is not limited to the specific illustrations shown. Such changes and modifications are accordingly within the teaching of this invention as defined by the claims appended hereto.

What is claimed is:

1. A process for reducing the salt content of saline feed water which comprises adding to saline water having a saline concentration greater than that of said saline feed water a gas to form a solid hydrate of said gas with some of the water of said saline water whereby there results a more concentrated saline water, separating the solid hydrate from a major portion of said resulting more concentrated saline water and contacting the solid hydrate with saline water of a concentration at least equal to that of said saline feed water but less than that of said resulting more concentrated saline water to wash occluded saline water therefrom.

2. A process for reducing the salt content of saline feed water which comprises adding to saline water having a saline concentration greater than that of said saline feed water a gas to form a solid hydrate of said gas with some of the water of said saline water whereby there results a more concentrated saline water, separating the solid hydrate from a major portion of said resulting more concentrated saline water and contacting the solid hydrate with saline wash water having a saline concentration less than that of said resulting more concentrated saline water but greater than that of the saline feed water to wash occluded concentrated saline water therefrom.

3. A process for reducing the salt content of saline feed water which comprises adding to saline water having a saline concentration greater than that of said saline feed water a gas to form a solid hydrate of said gas with some of the water of said saline water whereby there results a more concentrated saline water, separating the solid hydrate from a major portion of said resulting more concentrated saline water and contacting the solid hydrate with saline wash water having a saline concentration less than that of the saline water to which said gas is added and passing the solid hydrate with occluded said resulting more concentrated saline water and the saline wash water through a centrifuging zone to separate the solid hydrate from the occluded saline water and the saline wash water and recovering water from said hydrate.

4. A process for reducing the salt content of saline feed water which comprises adding said saline water a gas to form a solid hydrate with said water and a concentrated saline water, separating the solid hydrate from a major portion of said concentrated saline water and contacting the solid hydrate with saline wash water and passing the solid hydrate with occluded concentrated saline water and the saline wash water through a centrifuging zone to separate the solid hydrate, washing remaining saline water from the solid hydrate by contacting the solid hydrate and saline water with a liquid which is substantially immiscible with saline water and which has a density different from that of the saline water and of the same relative density as the hydrate as related to the saline water, passing the hydrate, the saline water immiscible liquid and the saline water into a centrifuging zone and separating the liquid and the hydrate in one phase and the saline water in another phase.

5. A process for separating a solid hydrate from saline water having a density different from that of said hydrate which comprises contacting the solid hydrate and saline water with a liquid which is substantially immiscible with saline water and which has a density different from that of the saline water and of the same relative density as the hydrate as related to the saline water, passing the hydrate, the saline water immiscible liquid and the saline water into a centrifuging zone and separating the liquid and the hydrate in one phase and the saline water in another phase.

6. A process for separating a solid hydrate from saline water having a density different from that of said hydrate which comprises contacting the solid hydrate and saline water with a liquid which is substantially immiscible with saline water and which has a density such that the density of the hydrate is intermediate that of said saline water and said liquid to drive saline water away from the solid hydrate passing the hydrate, the saline water immiscible liquid and the saline water into a centrifuging zone and separating the liquid and the hydrate in one phase and the saline water in another phase.

7. A process for reducing the salt content of saline water which comprises adding to said saline water a gas to form a solid hydrate and a relatively concentrated saline water containing dissolved gas, separating said concentrated saline water from the solid hydrate and passing a water immiscible oil into contact with the concentrated saline water and absorbing the dissolved gas, separating the oil and absorbed gas from the concentrated saline water and recovering the gas from the oil.

8. A process for reducing the salt content of saline water which comprises adding to said saline water a gas to form a solid hydrate and a relatively concentrated saline water containing dissolved gas, separating said concentrated saline water from the solid hydrate and passing a water immiscible oil in direct heat exchange relation with said concentrated saline water to cool the oil and absorb the dissolved gas, separating the oil and absorbed gas from the concentrated saline water and recovering the gas from the oil and passing the cooled oil in direct heat exchange relation with said saline water to cool the same prior to the hydrate formation stage.

9. A process for reducing the salt content of saline feed water which comprises adding to said saline water a gas to form a solid hydrate and a relatively concentrated saline water, separating said concentrated saline water from the solid hydrate, recovering water from said hydrate, the water containing dissolved gas and passing a water immiscible gas absorbing oil into contact with said water and absorbing said dissolved gas, separating the oil and absorbed gas from the water and recovering the gas from the oil.

10. A process for reducing the salt content of saline feed water which comprises adding to said saline water a gas to form a solid hydrate and a relatively concentrated saline water, separating said concentrated saline water from the solid hydrate, recovering water from said hydrate, the water containing dissolved gas and passing a water immiscible gas absorbing oil in direct heat exchange relation with said water to cool the oil and absorb the gas, separating the oil and absorbed gas from the water and recovering the gas from the oil and passing the cooled oil in direct heat exchange relation with said saline feed water to cool the feed water prior to the hydrate formation stage.

11. A process for reducing the salt content of saline feed water which comprises adding to said saline water a gas to form a solid hydrate with said water and a concentrated saline water, separating the solid hydrate from a major portion of said concentrated saline water and contacting the solid hydrate with saline wash water to wash occluded concentrated saline water therefrom, said washing operation being carried out in a battery of centrifuging zones, the solid hydrate and concentrated saline water being passed into a first end of the battery and advanced toward a second end while wash water having a saline content less than that of a concentrated saline water is passed into the second end and advanced toward the first end and carrying out the extraction in countercurrent relationship.

12. A process for reducing the salt content of saline feed water which comprises adding to said saline water a gas to form a solid hydrate with said water and a concentrated saline water, separating the solid hydrate from a major portion of said concentrated saline water and contacting the solid hydrate with saline wash water to wash occluded concentrated saline water therefrom, said washing operation being carried out in a battery of centrifuging zones, the solid hydrate and concentrated saline water being passed into a first end of the battery and advanced toward a second end while wash water having a saline content less than that of the concentrated saline water is passed into the second end and advanced toward the first end and carrying out the extraction in countercurrent relationship, the washing in each stage being effected by mixing the wash water and the hydrate crystals containing saline water more concentrated than the wash water and passing the mixture into a centrifuging zone and separating the mixture into a first phase containing hydrate occluded water of reduced saline contentt and a second phase containing saline water of greater saline concentration than the wash water.

13. A process for reducing the salt content of saline feed water which comprises adding to said saline water a gas to form a solid hydrate with said water and a concentrated saline water, separating the solid hydrate from a major portion of said concentrated saline water and contacting the solid hydrate with saline wash water to wash occluded concentrated saline water therefrom, said washing operation being carried out in a battery of centrifuging zones, the solid hydrate and concentrated saline water being passed into a first end of the battery and advanced toward a second end while wash water having a saline content less than that of the concentrated saline water is passed into the second end and advanced toward the first end and carrying out the extraction in countercurrent relationship, the washing in each stage being effected by mixing the wash water and the hydrate crystals containing saline water more concentrated than the wash water and passing the mixture into a centrifuging zone and separating the mixture into a first phase containing hydrate occluded water of reduced saline content and a second phase containing saline water of greater saline concentration than the wash water contacting the solid hydrate and saline water with a liquid which is substantially immiscible with saline water and which has a density different from said saline water to drive saline water away from the solid hydrate, passing the hydrate, the saline water immiscible liquid and the saline water into a centrifuging zone and separating the liquid and the hydrate in one phase and the saline water in another phase.

14. A process for reducing the salt content of saline feed water which comprises adding to said saline water a gas to form a solid hydrate with said water and a concentrated saline water, separating the solid hydrate from a major portion of said concentrated saline water and contacting the solid hydrate with saline wash water to wash occluded concentrated saline water therefrom, said washing operation being carried out in a battery of centrifuging zones, the solid hydrate and concentrated saline water being passed into a first end of the battery and advanced toward a second end while wash water having a saline content less than that of the concentrated saline water is passed into the second end and advanced toward the first end and carrying out the extraction in countercurrent relationship, the washing in each stage being effected by mixing the wash water and the hydrate crystals containing saline water more concentrated than the wash water and passing the mixture into a centrifuging zone and separating the mixture into a first phase containing hydrate occluded water of reduced saline content and a second phase containing saline water of greater saline concentration than the wash water contacting the solid hydrate and saline water with a liquid which is substantially immiscible with saline water and which has a density different from that of the saline water and of the same relative density as the hydrate as related to the saline water to drive saline water away from the solid hydrate, passing the hydrate, the saline water immiscible liquid and the saline water into a centrifuging zone and separating the liquid and the hydrate in one phase and the saline water in another phase.

15. A process for reducing the salt content of saline water which comprises adding to said saline water a gas to form a solid hydrate with said water and a relatively concentrated saline water, separating the solid hydrate from said concentrated saline water, subjecting the hydrate to heat to decompose it to water and liquefied gas, passing said water and liquefied gas through a centrifuging zone to separate the water and the liquefied gas into two separate phases of different density and recovering the two phases.

16. A process for reducing the salt content of saline water which comprises adding to said saline water a gas to form a solid hydrate with said water and a relatively concentrated saline water, separating the solid hydrate from said concentrated saline water, passing the solid hydrate into a hydrate decomposing zone, introducing a partially liquefied gas stream to contact the solid hydrate and passing the hydrate through the zone to heat it and decompose it to water and liquefied gas, passing said water and liquefied gas through a separator to separate the water and the liquefied gas into two separate phases of different density and recovering the two phases.

17. A process for reducing the salt content of saline water which comprises adding to said saline water a gas to form a solid hydrate with said water and a relatively concentated saline water, separating the solid hydrate from said concentrated saline water, passing the solid hydrate in divided form into a hydrate decomposing zone, introducing a partially liquefied gas stream of the same composition as the gas in the solid gas hydrate to contact the solid hydrate, circulating the hydrate and partially liquefied gas around a vertical baffle disposed within said zone to heat the hydrate and decompose it to water and liquefied gas and recovering the two phases.

18. A process for reducing the salt content of saline water which comprises adding to said saline water a gas to form a solid hydrate with said water and a relatively concentrated saline water, separating the solid hydrate from said concentrated saline water, passing the solid hydrate in divided form into a hydrate decomposing zone, introducing a partially liquefied gas stream of the same composition as the gas in the solid gas hydrate to contact the solid hydrate, circulating the hydrate and partially liquefied gas around a vertical baffle disposed within said zone to heat the hydrate and decompose it to water and liquefied gas, passing said water and liquefied gas through a separator to separate the water and the liquefied gas into two separate phases of different density and recovering the two phases.

References Cited in the file of this patent

UNITED STATES PATENTS

| | | |
|---|---|---|
| 2,904,511 | Donath | Sept. 15, 1959 |
| 2,996,187 | Payne | Aug. 15, 1961 |
| 3,027,320 | Buchanan | Mar. 27, 1962 |

OTHER REFERENCES

"Practical Organic Chemistry," including qualitative organic analysis by Vogel, 3rd ed., 1956, page 44.

Handbook of Chemistry and Physics, 26th ed., part 1, pages 956–57.